US005856905A

United States Patent [19]

Eckel et al.

[11] Patent Number: 5,856,905

[45] Date of Patent: Jan. 5, 1999

[54] TWO WIRE AIR GAP OFF POWER SUPPLY

[75] Inventors: David Philip Eckel, Wetherfield; Thomas James Batko, Wallingford, both of Conn.

[73] Assignee: Hubbell Incorporated, Orange, Conn.

[21] Appl. No.: 908,969

[22] Filed: Aug. 8, 1997

Related U.S. Application Data

[63] Continuation of Ser. No. 501,846, Jul. 13, 1995, abandoned, which is a continuation-in-part of Ser. No. 412,502, Mar. 29, 1995, Pat. No. 5,699,243, which is a continuation of Ser. No. 382,691, Feb. 2, 1995, abandoned.

[51] Int. Cl.[6] .......................... H01H 47/00; G05B 11/01

[52] U.S. Cl. ...................... 361/187; 307/116; 364/140.05

[58] Field of Search .......................... 364/140.01–140.1, 364/141, 146; 361/191, 209, 160, 195, 170, 93, 187; 307/125, 130, 131, 138, 114, 157, 140, 116, 141.8, 113; 363/126; 702/64

[56] References Cited

U.S. PATENT DOCUMENTS

| | | | |
|---|---|---|---|
| 4,340,826 | 7/1982 | Muchnick | 307/157 |
| 4,367,510 | 1/1983 | Watanbe | 361/160 |
| 4,433,356 | 2/1984 | Wyott | 361/191 |
| 4,713,598 | 12/1987 | Smith | 323/245 |
| 4,874,962 | 10/1989 | Hermans | 307/116 |
| 5,508,878 | 4/1996 | Pecore | 361/195 |

OTHER PUBLICATIONS

Product Brochure for Hubbell H. Moss Passive Intrared Wall Switch Sensor Models 1500A & 750A, 1993.

*Primary Examiner*—Reba I. Elmore
*Assistant Examiner*—Steven R. Garland
*Attorney, Agent, or Firm*—Roylance, Abrams, Berdo & Goodman, L.L.P.

[57] ABSTRACT

A power supply circuit is provided for selectively connecting and disconnecting a load from an alternating current power source having neutral and line conductors which comprises a transformer having a primary winding connected to the load and a secondary winding, a relay connected at one terminal thereof to the primary winding and connected at another terminal thereof to the line conductor, a control circuit connected to the relay and operable to open and close the relay, the relay being operable to provide power to the load when closed and to disconnect the line conductor from the primary winding when open, a rectifier circuit connected in parallel with the secondary winding, and an air gap switching mechanism connected to the relay and the control circuit and operable to open the relay when the air gap switching mechanism is activated.

23 Claims, 6 Drawing Sheets

TWO WIRE AIR GAP OFF POWER SUPPLY

This is a continuation of application Ser. No. 08/501,846 filed Jul. 13, 1995, now abandoned which is a continuation-in-part of U.S. patent application Ser. No. 08/412,502, filed Mar. 29, 1995, now U.S. Pat. No. 5,699,243, the entire subject matter of which is hereby incorporated herein by reference for all purposes and which is a continuation of U.S. patent application Ser. No. 08/382,691, filed Feb. 2, 1995.

FIELD OF THE INVENTION

The invention relates to a two wire electrical power supply circuit for connecting a load to an alternating current (AC) power source and supplying power to a load switching element which interrupts or limits line to load current and line to ground current.

BACKGROUND OF THE INVENTION

A number of electrical power supply circuits such as wall switch units for lighting fixtures are potentially hazardous to individuals (e.g., repairmen). They comprise an ON/OFF switch or other identified or implied OFF function which most users assume isolates the circuit from the power source when the switch is off. In other words, a user may assume during servicing and maintenance that there are no live parts on the load side of the power supply circuit while the power supply circuit is in the identified OFF mode.

Until recently, safety requirements under Underwriters Laboratories (UL) standard 773 for nonindustrial photoelectric switches for lighting control have not been as stringent as requirements for other electric control circuits in different environments, and most ON/OFF switches and OFF mode identifying functions have been in compliance with UL 773. New safety standards have been devised, however, under the newly proposed UL 773A standard which requires an air gap switch in these types of electrical circuits. The newly proposed UL 773A standard requires that a power supply circuit incorporate either an air gap switch, or a solid-state switching device which restricts leakage currents to 0.5 milliamperes or less back to the load.

U.S. Pat. No. 4,713,598 discloses a power supply circuit 36 which comprises a current transformer XFR to derive operating current, as shown in FIGS. 1A and 1B. The primary winding W1 of the transformer XFR is in series with a switching mechanism SW (e.g., a relay). When the switching mechanism SW is closed, current flows through the primary winding W1 and is induced in the secondary winding W2. Voltage across the secondary winding W2 provides operating power via a power supply 42 (i.e., diode CR1 and capacitor C1) for the control circuitry 44 (i.e., sensor S and amplifier AMP). When the switching mechanism SW is open, the voltage differential for deriving operating current is across the secondary winding W2 to operate a power supply 42.

One of the drawbacks of this design is possible noncompliance with the newly proposed UL 773A safety standard. When the relay SW is open, the device 36 is still electrically connected to the AC source via the capacitor C2 and the secondary winding W2. When analyzed with electronic test equipment, it can be found on some devices that a 2.5 milliamp current flows through the secondary winding W2 of the transformer XFR even though the switching mechanism SW is in the OFF or open position and the load (e.g., a lamp) is no longer energized by the power source. Further, the device 36 does not appear to comprise energy or memory storage means for interrupting the full line to load current path when the load has been opened prior to the device 36 being put in an OFF position by, for example, a slide switch (not shown) or other identified or implied OFF switch. Thus, if the switch SW is a latching relay, and the lamp has burned open, it appears that a repairman could be exposed to full AC line current (e.g., 15 amperes). This is because the power supply circuit in FIGS. 1A and 1B does not provide means for changing the state of the switch SW, that is, no identified or implied OFF switch is provided to either directly or indirectly open the current path to the load. The lamp, therefore, is actually powered on until the relay SW is opened, regardless of whether the slide switch is placed in the OFF position. In addition, current transformers also have a minimum load requirement. Thus, a need exists for a power supply circuit which complies with the newly proposed UL 773A standard.

SUMMARY OF THE INVENTION

The disadvantages and deficiencies of existing power supply circuits are overcome by the present invention. In accordance with an aspect of the invention, a power supply circuit for selectively connecting and disconnecting a load from an alternating current power source having neutral and line conductors is provided which comprises a transformer having a primary winding connected to the load and a secondary winding, a relay connected at one terminal thereof to the primary winding and connected at another terminal thereof to the line conductor or a load conductor connecting the load to the power supply circuit, a control circuit connected to the relay and operable to open and close the relay, the relay being operable to complete and interrupt a current path along the line conductor, the primary winding and the load conductor when closed and open, respectively, a first rectifier circuit connected in parallel with the secondary winding, and an air gap switching mechanism connected to the relay and the control circuit and operable to open the relay when the air gap switching mechanism is activated.

In accordance with another aspect of the invention, a power supply circuit is provided which comprises a processor circuit and an air gap detection circuit and the air gap switching mechanism comprises single-pole, double-throw, double-pole, double-throw or other switch having a first set of contacts connected in series with the transformer, the transformer and the first set of contacts being connected in parallel with the first rectifier circuit, and a second set of contacts connected to an air gap detection circuit, the air gap switching mechanism being operable to disconnect the transformer from the first rectifier circuit when the switch is in a first position, the air gap detection circuit being operable to detect a decrease in voltage and the processor being operable to open the relay in response thereto. The air gap detection circuit is also operable to detect a decrease in voltage when the switch is in a second position connecting the transformer to the first rectifier circuit, the relay is closed and the load is open, and to open the relay in response to the detection.

In accordance with another aspect of the present invention, the air gap switching mechanism comprises a switch in series with the secondary winding and operable to connect and disconnect an air gap detection circuit to and from the secondary winding when in first and second positions, respectively. The air gap detection circuit is operable to detect an increase in voltage when the switch is in the first position, and the processor circuit is operable to open the relay in response thereto.

In accordance with yet another aspect of the invention, a relay is connected at one terminal thereof to the primary winding of the transformer when closed, and is connected at another terminal thereof to the line conductor. The relay operates as an air gap switching mechanism operable to provide power to the load when closed and to disconnect the line conductor from the primary winding when open.

In accordance with yet another embodiment of the invention, the power supply circuit can provide circuit components with steady state power or with selectively pulsed power to both the load and ground.

BRIEF DESCRIPTION OF THE DRAWINGS

These and other features and advantages of the present invention will be more readily apprehended from the following detailed description when read in connection with the appended drawings, which form a part of this original disclosure, and wherein.

DETAILED DESCRIPTION OF THE PREFERRED EMBODIMENTS

Figure 1A:
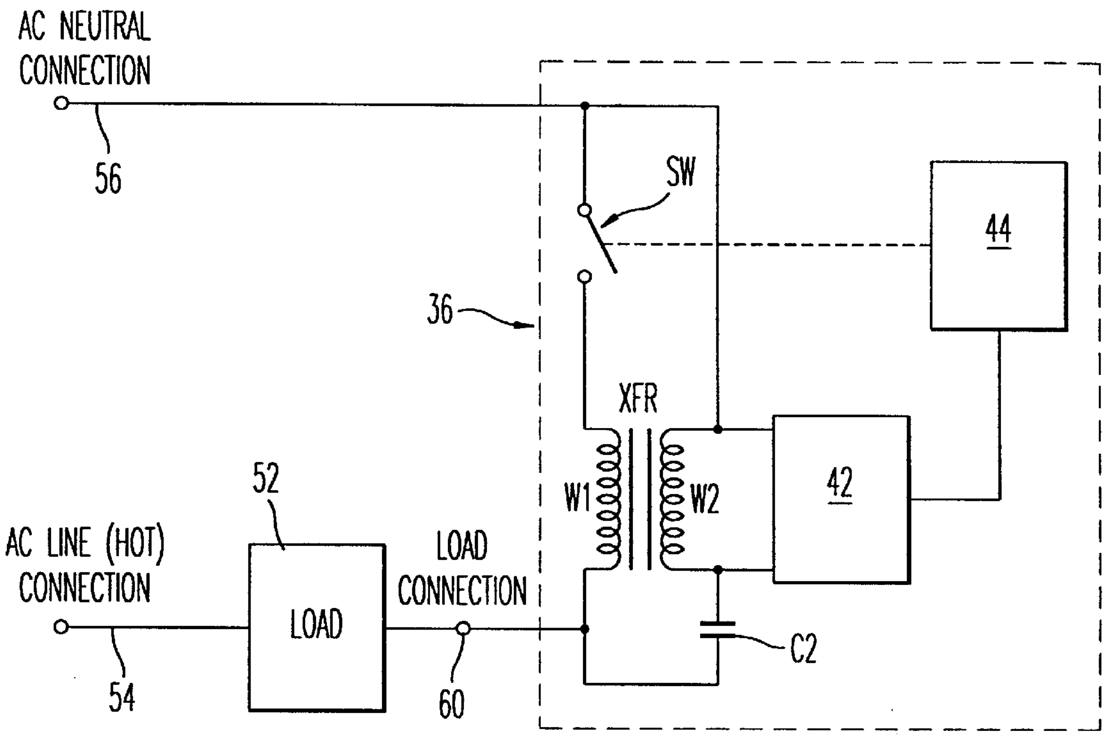
FIG. 1A PRIOR ART
FIGS. 1A and 1B are schematic block diagrams of a prior art power supply circuit.
Figure 1B:
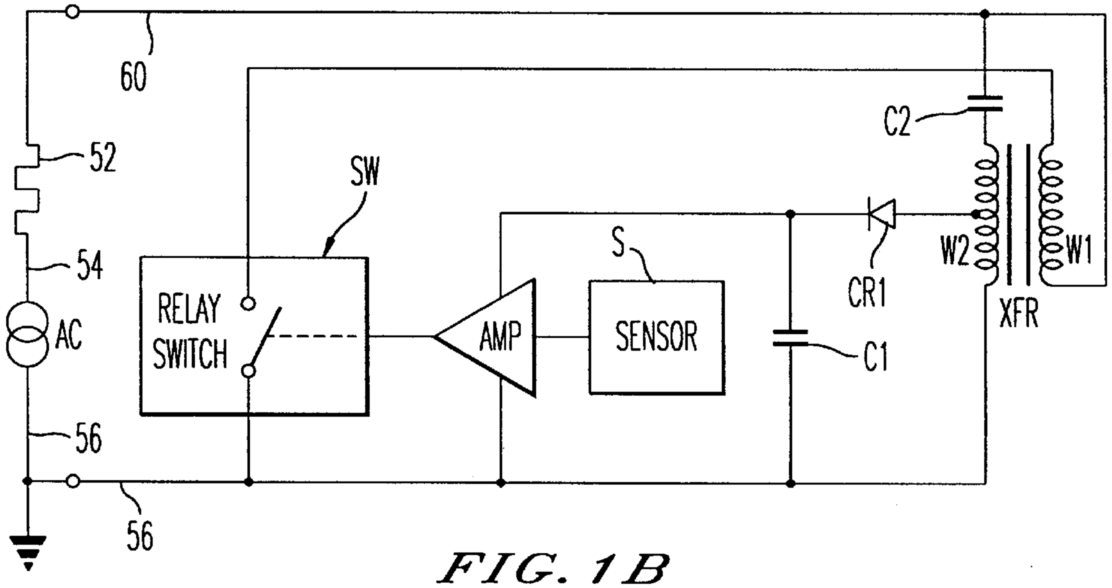
FIG. 1B PRIOR ART
Figure 2:
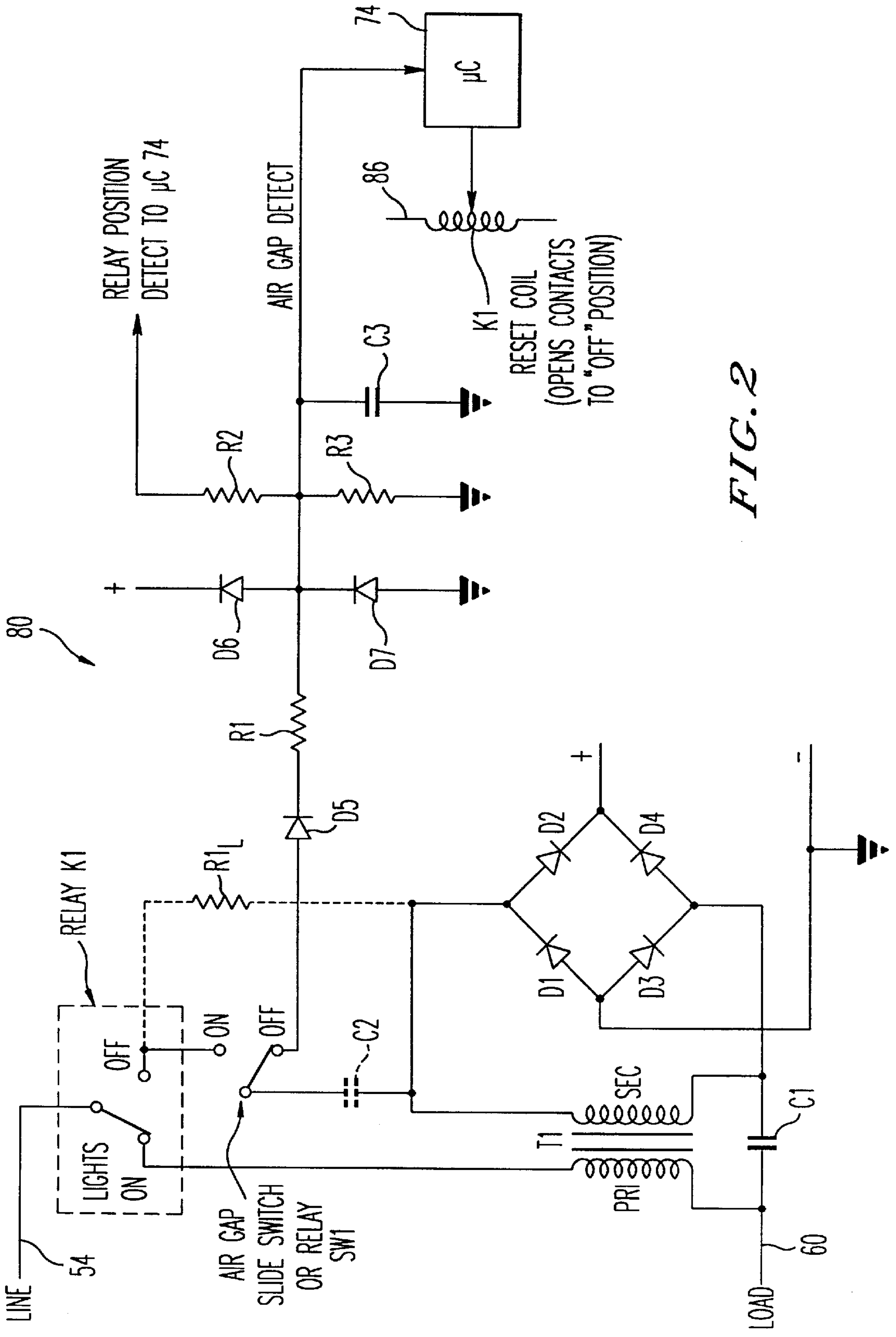
FIGS. 2 through 6 are schematic diagrams of two wire air gap off power supply circuits constructed in accordance with respective embodiments of the present invention.

FIG. 2 depicts a power supply circuit 80 for connecting a load such as a lighting fixture to an AC power source. The load is connected to the neutral conductor 56 of an AC power source. The power supply circuit 80 is connected to the load via a load conductor 60, and is connected to the AC power source via the AC power or hot line conductor 54.

With continued reference to FIG. 2, the power supply circuit 80 comprises a switch mechanism K1 for controllably completing or interrupting the current path between the line or power conductor 54 and the return path to the AC power source, i.e., the load conductor 60, the load 52 and the neutral conductor 56. The switch mechanism K1 can be, but is not limited to, a slide switch, a press switch, a relay, a semiconductor switch, an optocoupler, a thyristor, or any other mechanical, electromechanical or electronic device for opening and closing a circuit. The switching mechanism K1 can be controlled manually (e.g., a press button or slide switch), or by an electronic control circuit which can include, but does not require, a microcontroller. The switching mechanism K1 is preferably a relay.

The relay K1 of the power supply circuit 80 can be switched to the ON position by a microcontroller 74 to provide power to the load, and to the OFF position to power down the load. When the relay K1 is in the ON position, the power supply circuit 80 applies full load current through the primary winding of a transformer T1. In addition, a rectifier circuit D1 through D4 is energized because it is connected to the secondary winding of the transformer. When the relay K1 is open or in the OFF position, the power supply circuit 80 provides a higher voltage drop across the AC mains, that is, between the line and load conductors, via the secondary winding of the transformer than when the relay K1 is closed.

In accordance with an embodiment of the invention, an air gap switch SW1 is connected to the secondary winding of the transformer T1 to rectify the voltage drop across the secondary winding of the transformer when the relay K1 is in the OFF position and the load is powered down. When the air gap switch is switched to the ON position, the capacitor C3, which can be initially charged via the secondary winding of the transformer T1 when the relay K1 is on, discharges through the resistor R3 and is no longer energized. When the air gap switch is switched to the OFF position, the capacitor C3 charges via the diodes D5 and D7 and the resistor R1. The microcontroller detects a voltage increase due to the charging of the capacitor C3 and switches the relay K1 to the OFF position. The primary winding is therefore open and does not provide a return current path to the load. The resistor $Ri_L$ and the capacitor C2 can additionally be provided, as shown in phantom, to derive charging current if desired. Further, the resistor $Ri_L$ and the capacitor C2 can be used in lieu of the air gap switch SW1 to limit current to a desired amount such as 0.5 milliamperes. The air gap switch SW1 can be, but is not limited to, a slide switch, a press switch, a relay, a semiconductor switch, an optocoupler, a thyristor, or any other mechanical, electromechanical or electronic device for opening and closing a circuit. The air gap switch SW1 can be controlled manually (e.g., a press button or slide switch), or by an electronic control circuit which can include, but does not require, a microcontroller.

Thus, the circuit 80 is advantageous because it can provide a low input impedance and therefore low voltage drop across the AC mains and the switch K1 when the load is on (i.e., the switch is closed). The switch K1 also operates in a high impedance state and therefore creates a high voltage drop across the AC mains when the load is off (i.e., the switch K1 is open). The air gap switch SW1, which can be, for example, a form C relay, rectifies the voltage at the secondary of the transformer when the load is off.

Figure 3:
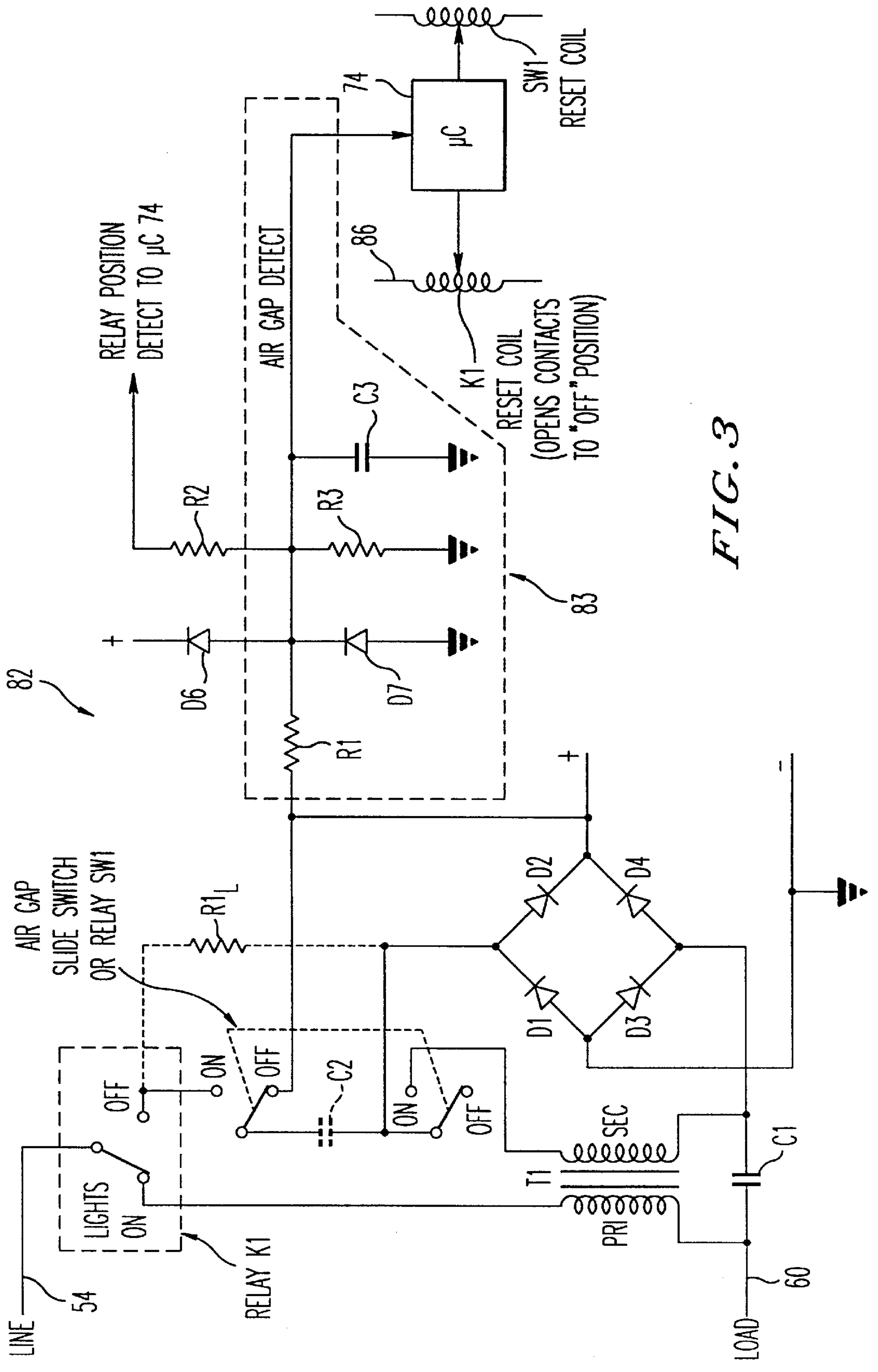

FIG. 3 depicts another power supply circuit 82 for connecting a load such as a lighting fixture to an AC power source which comprises an air gap switch and detection circuit that operates conversely with respect to the circuit shown in FIG. 2. The circuit comprises a relay K1 that provides full load current through the primary winding of a transformer when in the ON position. An air gap detection circuit 83 is provided which comprises, for example, a diode D7, resistors R1 and R3, a capacitor C3, as indicated in the phantom box. The air gap detection circuit 83 preferably operates in conjunction with the microcontroller 74. If the air gap switch SW1 is in the ON position, relay K1 is in the ON position and a lamp load, for example, burns open, the air gap detection circuit 83 detects a drop in the rectified voltage across the secondary winding via diodes D1 through D4 and resistor R1.

The microcontroller 74 opens the relay K1 to the OFF position in response to the detected voltage drop. If the air gap switch is also a relay, the microcontroller can move the air gap switch SW1 to the OFF position, as well. Thus, even if a lamp load burned open prior to switching relay K1 to the OFF position, a repairman is not exposed to full AC line current (e.g., 15 amperes).

Figure 4:
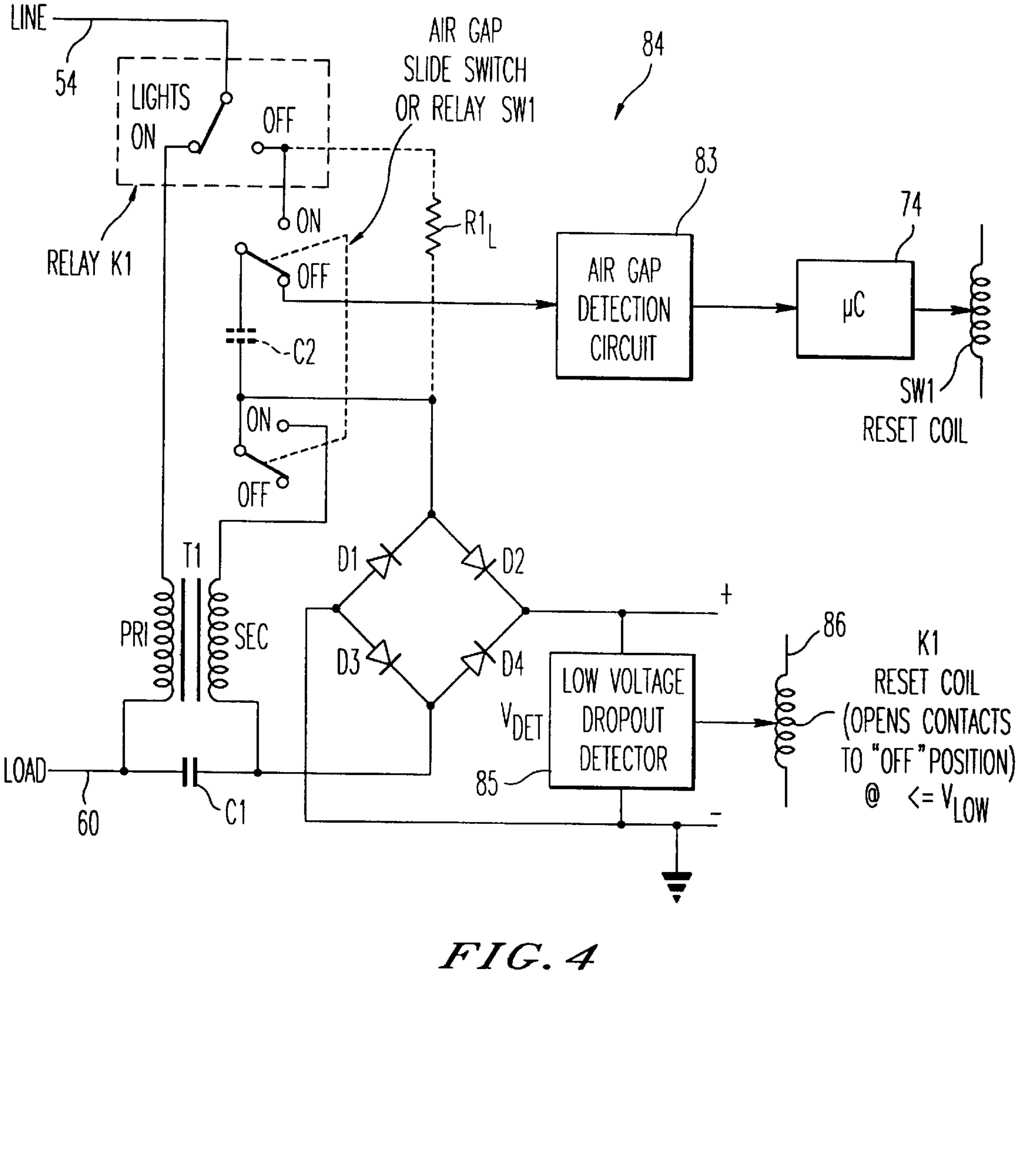

The power supply circuit 84 depicted in FIG. 4 is similar to the circuit in FIG. 3 in that the air gap switch SW1 is a double-pole, double-throw switch, and the air gap detection circuit 85 is a low voltage drop-out detection circuit. Thus, when the relay K1 is ON and air gap switch is in the OFF position, the rectifier is no longer connected to the secondary winding of the transformer T1. The voltage detection circuit 85 across the rectifier circuit D1 through D4 therefore detects a voltage drop.

The reset coil 86 for relay K1 receives a signal from the voltage detection circuit 85 and switches the relay K1 to the OFF position. In addition, if the relay K1 is in the ON position and the lamp load burns open, then the voltage detection circuit 85 detects a voltage drop and switches the relay K1 to the OFF position. Alternatively, if the air gap switch SW1 is a relay, and the circuit 84 comprises an air gap detection circuit (e.g., circuit 83 in FIG. 3), a relay K1 reset coil and a relay SW1 reset coil, the microcontroller can switch both the relay K1 and the air gap switch SW1 to the OFF position automatically.

Figure 5:
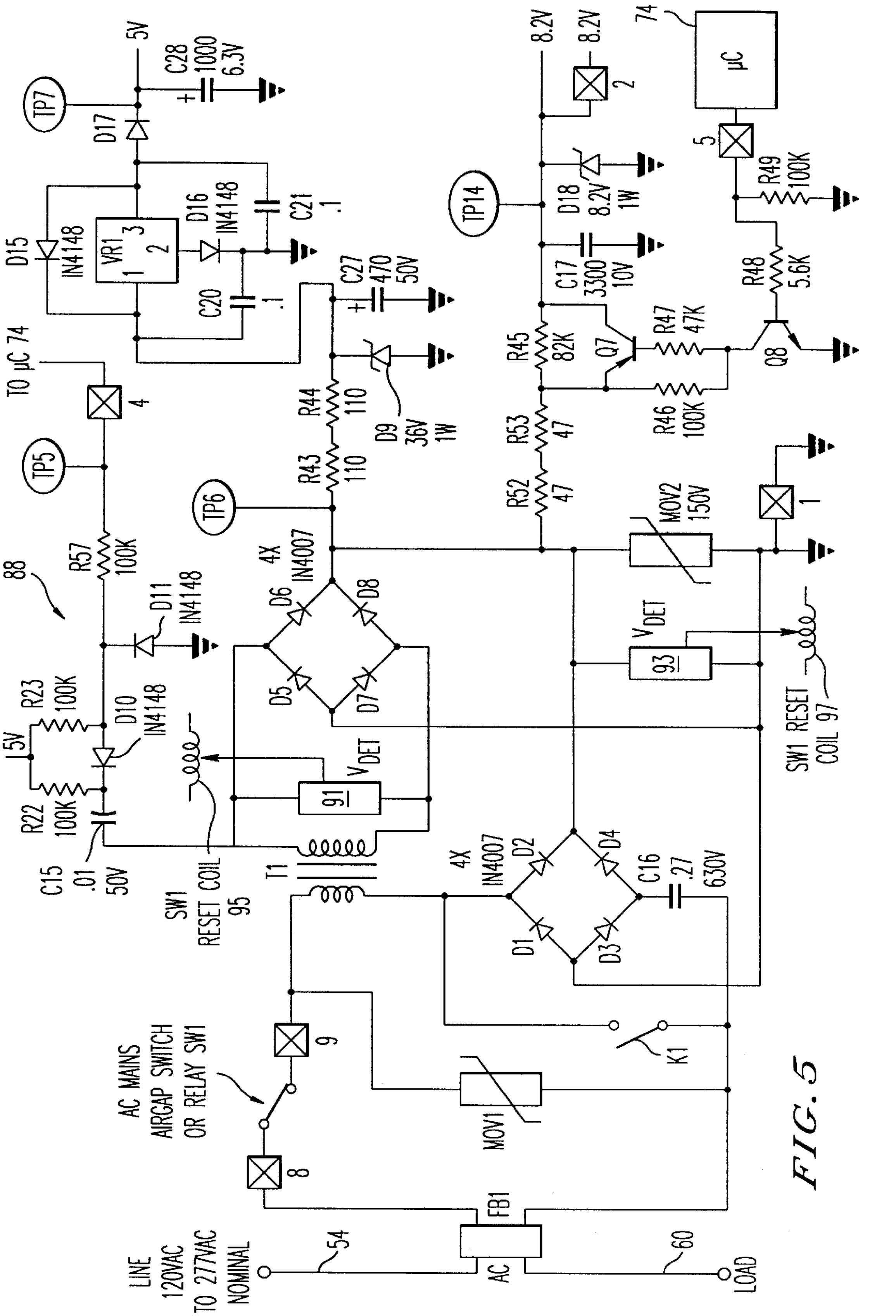

The power supply circuit 88 depicted in FIG. 5 comprises an AC mains air gap switch or relay SW1. If the air gap switch SW1 is closed and the relay K1 is closed, full load current is applied through the primary winding of transformer T1. The rectifier circuit D5 through D8 is energized because it is connected to the secondary winding of the transformer T1. A voltage regulator VR1 is provided to regulate the voltage to 5 volts. If the relay K1 is open, the rectifier circuit D1 through D4 is also energized. The microcontroller can assert a pulsed signal (e.g., a 5 volt signal, or a low signal if transistor Q8 is a PNP-type transistor) to the transistor Q8. The transistors Q7 and Q8 conduct and therefore shunt higher current around the resistor R45 to the capacitor C17 for a fast charge for discharging at a later time when, for example, an 8.2 volt supply is needed to energize a component such as the relay K1. The diode D18 shunt regulates 8.2 volts to limit the voltage within operational ratings of the capacitor C17 and other loads. The power supply circuit depicted in FIG. 5 is therefore advantageous because it can also provide pulsed power versus steady state power to circuit components requiring more power and/or current than a 5 volt regulated supply in accordance with a signal generated by a microcontroller. Pulses, for example, can be generated as needed by the microcontroller after the relay K1 or a light emitting diode (LED) or buzzer are energized so that the capacitor C17 can be recharged. The pulses can be generated so as to occur at fixed or varying intervals or duty cycles, at any time or for essentially any reason. The bridge rectifier circuits D5 through D8 and D1 through D4 therefore are not required to provide high, continuous current. The power supply control circuit allows increased line side or lighting fixture load, while decreasing the current drawn from the rectifier circuits. The resistor R45 can be a high or low impedance, depending on the trickle charge needs of the device being energized.

With continued reference to FIG. 5, the power supply circuit 88 can be provided with a voltage detection circuit 91 connected across the secondary winding of the transformer T1, or a voltage detection circuit 93 connected to the rectifier circuit D1 through D4, or both voltage detection circuits 91 and 93. The voltage detection circuits 91 and 93 are preferably low voltage drop-out detectors. If a lamp load, for example, is ON (i.e., relay K1 is closed) and the lamp load burns open, a voltage detection circuit 91 detects a decrease in the voltage across the secondary winding and operates a relay SW1 reset coil 95 to open the air gap switch SW1. If the lamp load is OFF, the relay K1 is open, and the lamp load burns open, the voltage detector circuit 93 detects a decrease in the voltage at the rectifier circuit D1 through D4 and operates a relay SW1 reset coil 97 to open the air gap switch SW1.

Figure 6:
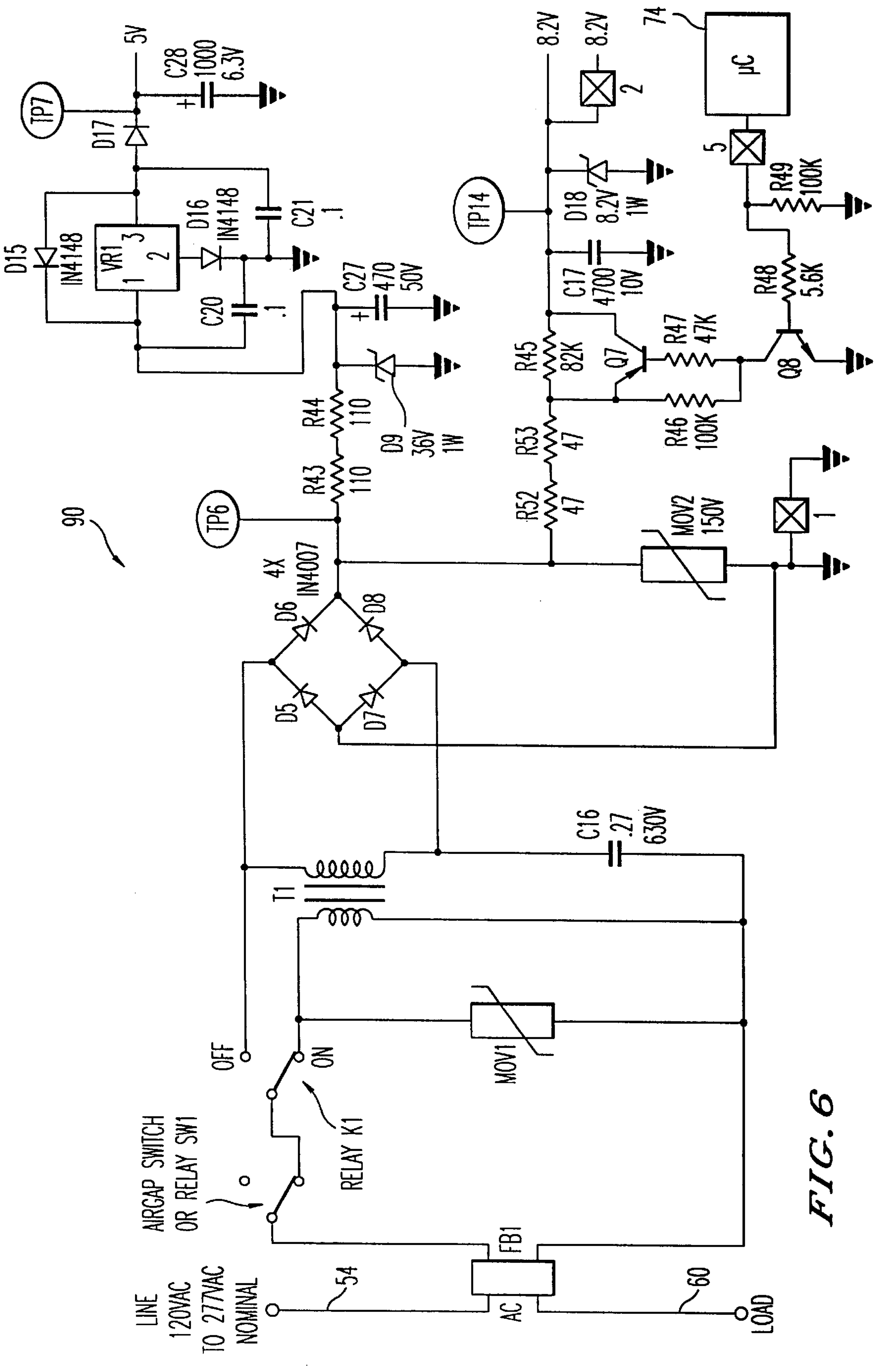

The power supply circuit 90 in FIG. 6 is similar to the power supply circuit 88 depicted in FIG. 5, except that the relay K1 is provided in series with the primary and secondary windings of the transformer T1. An air gap switch SW1 at the AC mains can be used to interrupt or limit current to an acceptable level. Alternatively, the relay K1 can be switched to the OFF position via the microcontroller 74, for example. Accordingly, full line voltage is not applied to the load via the primary winding of the transformer. An impedance element (e.g, capacitor C16) is used at the rectifier circuit D5 through D8 to ensure leakage current from line to load does not exceed the 0.5 milliampere maximum limit of the newly proposed UL 773A standard, for example.

Resistors and capacitors can be placed on either side of or on both sides of bridge rectifier D1 through D4 and bridge rectifier D5 through D8, which are depicted in different ones of FIGS. 2 through 6, to regulate output voltage. Although the bridge rectifiers depicted in the various views are illustrated as full-wave rectifiers, it is to be understood that half wave-rectifiers can be used.

While certain advantageous embodiments have been chosen to illustrate the invention, it will be understood by those skilled in the art that various changes and modifications can be made herein without departing from the scope of the invention as defined in the appended claims.

What is claimed is:

1. A power supply circuit for selectively connecting and disconnecting a load from an alternating current power source having neutral and line conductors, said load being connected to said neutral conductor and to said power supply circuit via a load conductor, said power supply circuit comprising:

a transformer having a primary winding connected to said load and a secondary winding;

a relay connected at one terminal thereof to said primary winding and connected at another terminal thereof to one of said line conductor and said load conductor;

a control circuit connected to said relay and operable to open and close said relay, said relay being operable to complete and interrupt a current path along said line conductor, said primary winding and said load conductor when closed and open, respectively;

a first rectifier circuit connected in parallel with said secondary winding; and an air gap switching mechanism connected to said control circuit, said control circuit being operable to detect a change in voltage across said secondary winding when said air gap switching mechanism is activated and to open said relay.

2. A power supply circuit for selectively connecting and disconnecting a load from an alternating current power source having neutral and line conductors, said load being connected to said neutral conductor and to said power supply circuit via a load conductor, said power supply circuit comprising:

a transformer having a primary winding connected to said load and a secondary winding;

a relay connected at one terminal thereof to said primary winding and connected at another terminal thereof to one of said line conductor and said load conductor;

a control circuit connected to said relay and operable to open and close said relay, said relay being operable to complete and interrupt a current path along said line conductor, said primary winding and said load conductor when closed and open, respectively;

a first rectifier circuit connected in parallel with said secondary winding;

a resistor connected to said first rectifier circuit;

a capacitor connected to said resistor;

a switch connected in parallel with said resistor and having substantially less impedance when closed than said resistor; and a processor circuit to selectively close said switch to generate a pulse signal to charge said capacitor.

3. A power supply circuit as claimed in claim 2, wherein said processor circuit is programmable to generate said pulse signal in accordance with at least one of a group of conditions consisting of a fixed duty cycle, a varying duty cycle, random intervals, and following operations of said relay.

4. A power supply circuit as claimed in claim 2, further comprising an indicator, said processor circuit being programmable to generate said pulse signal in response to operation of said indicator.

5. A power supply circuit as claimed in claim 2, wherein said processor circuit is programmable to generate said pulse signal to operate said relay.

6. A power supply circuit as claimed in claim 2, further comprising an air gap switch connected to at least one of said line conductor and said neutral conductor and operable to interrupt the current path from said power source to said load when open, said processor circuit being programmable to generate said pulse signal to operate said air gap switch.

7. A power supply circuit for selectively connecting and disconnecting a load from an alternating current power source having neutral and line conductors, said load being connected to said neutral conductor and to said power supply circuit via a load conductor, said power supply circuit comprising:

a transformer having a primary winding connected to said load and a secondary winding;

a relay connected at one terminal thereof to said primary winding and connected at another terminal thereof to one of said line conductor and said load conductor;

a control circuit connected to said relay and operable to open and close said relay, said relay being operable to complete and interrupt a current path along said line conductor, said primary winding and said load conductor when closed and open, respectively;

a first rectifier circuit connected in parallel with said relay; and a second rectifier circuit connected in parallel with said secondary winding.

8. A power supply circuit as claimed in claim 7, wherein said control circuit comprises:

a resistor connected to said first rectifier circuit;

a capacitor connected to said resistor;

a switch connected in parallel with said resistor and having substantially less impedance when closed than said resistor; and a processor circuit to selectively close said switch to generate a pulse signal to charge said capacitor.

9. A power supply circuit as claimed in claim 8, wherein said processor circuit is programmable to generate said pulse signal in accordance with at least one of a group of conditions consisting of a fixed duty cycle, a varying duty cycle, random intervals, and following operations of said relay.

10. A power supply circuit as claimed in claim 8, further comprising an indicator, said processor circuit being programmable to generate said pulse signal in response to operation of said indicator.

11. A power supply circuit as claimed in claim 8, wherein said processor circuit is programmable to generate said pulse signal to operate said relay.

12. A power supply circuit as claimed in claim 8, further comprising an air gap switch connected to at least one of said line conductor and said load conductor and operable to interrupt the current path from said power source to said load when open, said processor circuit being programmable to generate said pulse signal to operate said air gap switch.

13. A power supply circuit as claimed in claim 7, further comprising an air gap switch connected to at least one of said line conductor and said load conductor and operable to interrupt the current path from said power source to said load when open, and a voltage detection circuit connected in parallel with said secondary winding, said voltage detection circuit being operable to open said air gap switch when said relay is closed and said load is open.

14. A power supply circuit as claimed in claim 7, further comprising an air gap switch connected to at least one of said line conductor and said load conductor and operable to interrupt the current path from said power source to said load when open, and a voltage detection circuit connected in parallel with said first rectifier circuit, said voltage detection circuit being operable to open said air gap switch when said relay is open and said load is open.

15. A power supply circuit for selectively connecting and disconnecting a load from an alternating current power source having neutral and line conductors, said load being connected to said neutral conductor and to said power supply circuit via a load conductor, said power supply circuit comprising:

a transformer having a primary winding connected to said load and a secondary winding;

a relay connected at one terminal thereof to said line conductor and connected at another terminal thereof to said primary winding when closed and to said secondary winding when open; and a first rectifier circuit connected in parallel with said secondary winding.

16. A power supply circuit for selectively connecting and disconnecting a load from an alternating current power source having neutral and line conductors, said load being connected to said neutral conductor and to said power supply circuit via a load conductor, said power supply circuit comprising:

a transformer having a primary winding connected to said load via a load conductor and a secondary winding;

a relay connected at one terminal thereof to said primary winding and connected at another terminal thereof to said line conductor;

a control circuit connected to said relay and operable to open and close said relay, said relay being operable to provide power to said load when closed and to disconnect at least one of said line conductor and said load conductor from said primary winding when open;

a first rectifier circuit connected in parallel with said secondary winding; and an air gap switching mechanism connected to said relay and said control circuit, said control circuit being operable to detect a change in voltage across said secondary winding when said air gap switching mechanism is activated and to open said relay.

17. A power supply circuit for selectively connecting and disconnecting a load from an alternating current power source having neutral and line conductors, said load being connected to said neutral conductor and to said power supply circuit via a load conductor, said power supply circuit comprising:

a transformer having a primary winding connected to said load and a secondary winding;

a relay connected at one terminal thereof to said primary winding and connected at another terminal thereof to one of said line conductor and said load conductor;

a control circuit connected to said relay and operable to open and close said relay, said relay being operable to complete and interrupt a current path along said line conductor, said primary winding and said load conductor when closed and open, respectively;

a first rectifier circuit connected in parallel with said secondary winding;

an air gap switching mechanism connected to said control circuit and operable to open said relay when said air gap switching mechanism is activated, said control circuit comprising a processor circuit and an air gap detection circuit connected to said processor circuit, said air gap switching mechanism comprising a switch in series with said secondary winding and operable to connect and disconnect said air gap detection circuit to and from said secondary winding when switched to first and second positions, respectively.

18. A power supply circuit as claimed in claim 17, wherein said air gap detection circuit is operable to detect an increase in voltage when said switch is in said first position, said processor circuit being operable to open said relay in response thereto.

19. A power supply circuit as claimed in claim 17, wherein said switch is selected from the group consisting of a slide switch, a press button and a relay.

20. A power supply circuit for selectively connecting and disconnecting a load from an alternating current power source having neutral and line conductors, said load being connected to said neutral conductor and to said power supply circuit via a load conductor, said power supply circuit comprising:

a transformer having a primary winding connected to said load and a secondary winding;

a relay connected at one terminal thereof to said primary winding and connected at another terminal thereof to one of said line conductor and said load conductor;

a control circuit connected to said relay and operable to open and close said relay, said relay being operable to complete and interrupt a current path along said line conductor, said primary winding and said load conductor when closed and open, respectively;

a first rectifier circuit connected in parallel with said secondary winding;

an air gap switching mechanism connected to said control circuit and operable to open said relay when said air gap switching mechanism is activated, said control circuit comprising a processor circuit and an air gap detection circuit connected to said processor circuit, said air gap switching mechanism comprising a switch having a first set of contacts connected in series with said transformer, said transformer and said first set of contacts being connected in parallel with said first rectifier circuit, and a second set of contacts connected to said air gap detection circuit, said switch being operable to disconnect said transformer from said first rectifier circuit when said switch is in a first position, said air gap detection circuit being operable to detect a decrease in voltage and said processor circuit being operable to open said relay in response thereto.

21. A power supply circuit as claimed in claim 20, wherein said air gap detection circuit is operable to detect a decrease in voltage when said switch is in a second position connecting said transformer to said first rectifier circuit, said relay is closed and said load is open, and to open said relay in response to said detection.

22. A power supply circuit for selectively connecting and disconnecting a load from an alternating current power source having neutral and line conductors, said load being connected to said neutral conductor and to said power supply circuit via a load conductor, said power supply circuit comprising:

a transformer having a primary winding connected to said load and a secondary winding;

a relay connected at one terminal thereof to said primary winding and connected at another terminal thereof to one of said line conductor and said load conductor;

a control circuit connected to said relay and operable to open and close said relay, said relay being operable to complete and interrupt a current path along said line conductor, said primary winding and said load conductor when closed and open, respectively;

a first rectifier circuit connected in parallel with said secondary winding;

an air gap switching mechanism connected to said control circuit and operable to open said relay when said air gap switching mechanism is activated, said air gap switching mechanism comprising a switch in series with said secondary winding and being operable to connect and disconnect said first rectifier circuit to and from said secondary winding when closed and opened, respectively, and said control circuit being operable to detect a decrease in voltage and open said relay in response thereto.

23. A power supply circuit as claimed in claim 22, wherein said control circuit is operable to detect a decrease in voltage when said switch is closed, said relay is closed and said load is open, and to open said relay in response to said detection.

* * * * *